Patented Mar. 11, 1930

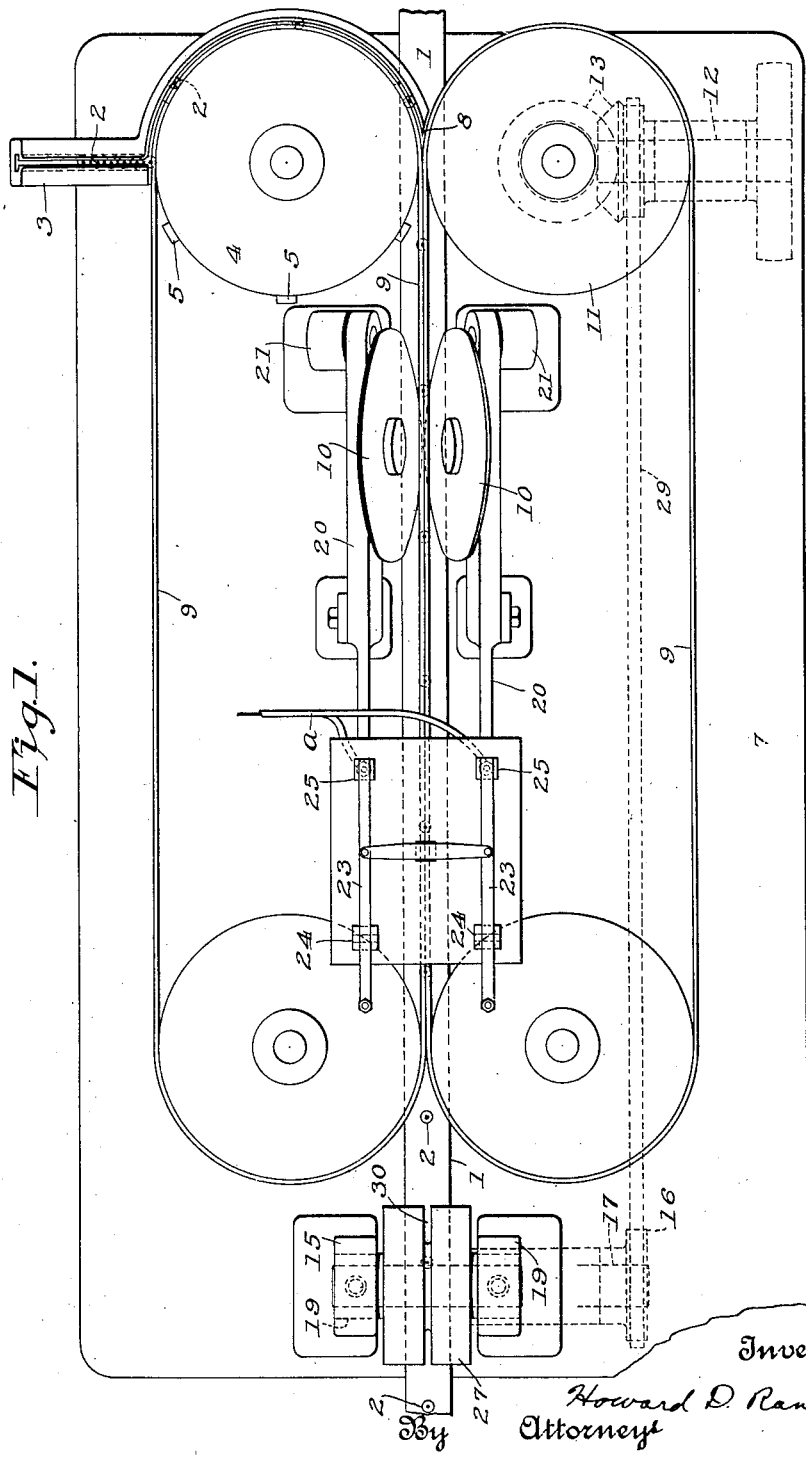

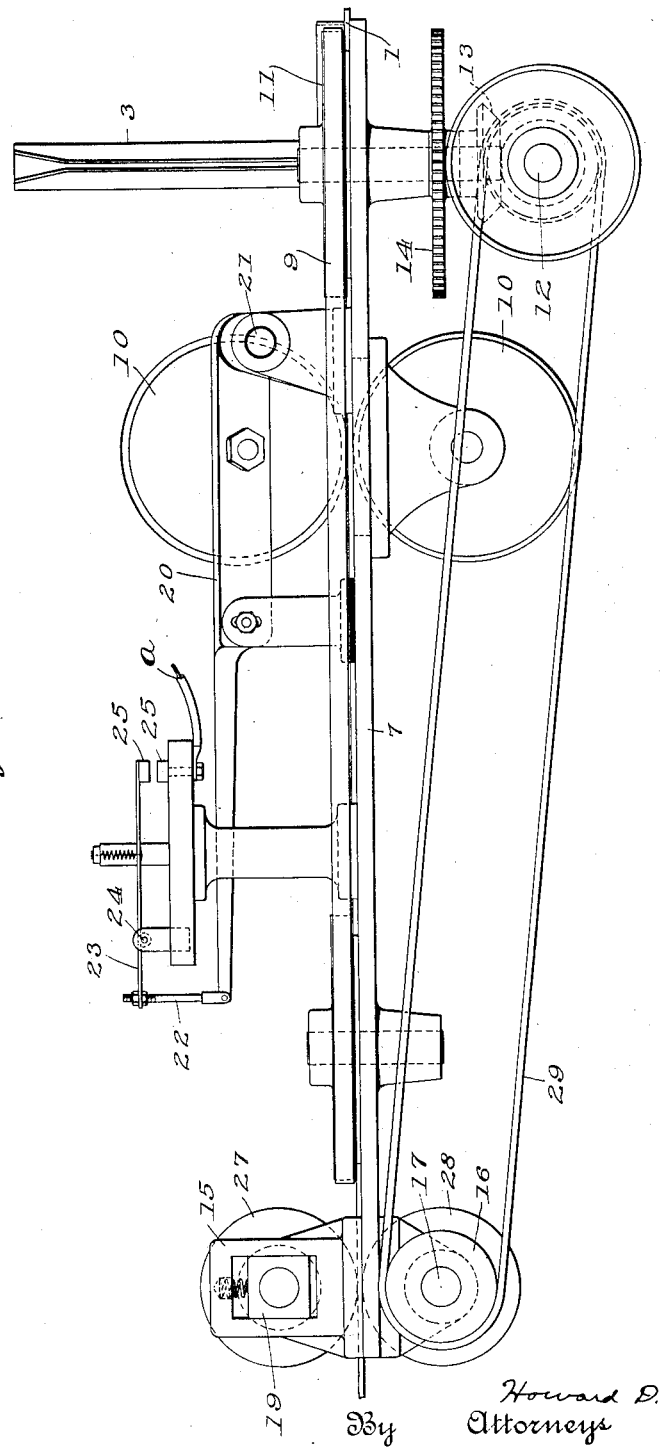

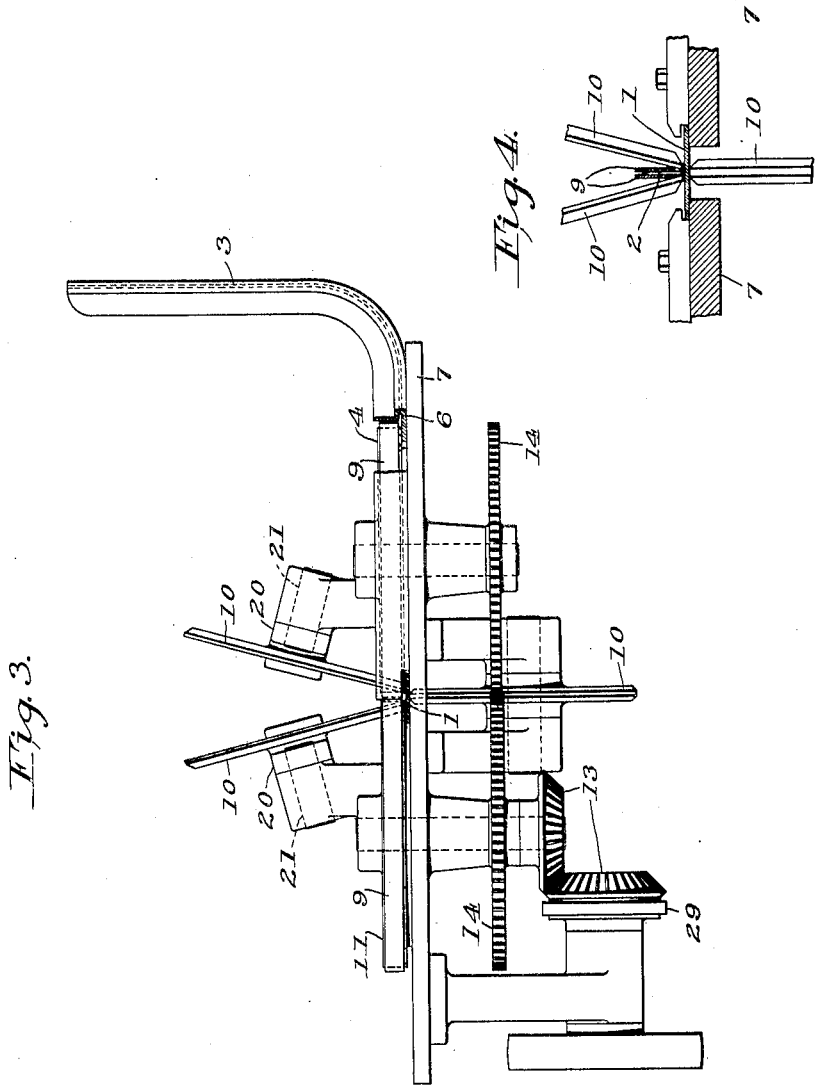

1,750,050

UNITED STATES PATENT OFFICE

HOWARD D. RANDALL, OF CINCINNATI, OHIO, ASSIGNOR TO THE RANDALL COMPANY, OF CINCINNATI, OHIO, A CORPORATION OF OHIO

WELDING MACHINE

Application filed June 22, 1927. Serial No. 200,568.

This invention relates to improvements in welding machines and more particularly to rotary welding machines, capable of welding devices to a continuously moving article.

One object of the invention is to weld intermittently attaching devices, such as nails, to a re-inforcing metal member intended for use with automobile interior constructions. The parts are so arranged that nails are intermittently fed to metal members which are likewise fed continuously through the machine, and the steps or process require that the welding be accomplished in a short interval of time i. e. while the metal member is passing a predetermined point, and furthermore that for a short interval of time thereafter the devices so welded to the metal member be held against accidental dislodgment until the weld becomes sufficiently firm to hold the parts securely together. The method employed is such that the head or some particular part of the nail or attaching device automatically raises the rotary welding device, thereby automatically connecting the said rotary device with a source of electric current, so that the metal surfaces are forced together while same are being heated by the flow of current causing a rapid accumulation of heat at the abutting surfaces of the two articles. All these advantages are obtained by employing rotary disks in circuit with a source of electric current, said disks being capable of applying pressure to the objects to be welded during the time the current is passing through same and also adapted to guide and hold the article against accidental movement of a kind that would tend to dislodge it from its contact with the other member.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a plan view of the machine. Fig. 2 is a side elevation. Fig. 3 is an end view and Fig. 4 is a detail of the welding device.

In this apparatus the metal member, which is continuously fed through the machine is marked 1 and the attaching device which is intermittently fed to said first mentioned member is marked 2. The container for the attaching devices is marked 3 and these attaching devices are fed by gravity to a point where they reach the path of movement of the guide roller 4. This guide roller 4 is one of several that are employed in connection with the flexible endless belts to be more fully described, and this guide roller 4 is formed with projecting lugs 5 that are spaced apart and act as pushers for feeding the nails intermittently to the rotary welding device. The container or chute 3 is formed with a base plate 6 which is supported by the bed of the machine and together with guide roller 4 forms a run way for the nails, which are delivered at the entrance to said run way with the head of the nail at the bottom thereof (Fig. 4) and the shanks projecting upwardly to be engaged by the lugs 5 and in this way the nails are intermittently guided around the periphery of the roller 4 and brought to the point 8 where they pass between two flexible endless belts 9. Beyond this point 8 the nails are carried on said metal member 1 to the point where the head of the nail passes beneath the rotary disks 10, which constitute the rotary welder of the machine, said disks being revolved by the contact of the periphery of the disk with said metal member 1. The guide rollers 4 and 11 are continuously operated through gear mechanism connected to the drive shaft of the machine. The drive shaft is marked 12 and the bevel pinions 13 (Fig. 3) connect the driving shaft 12 with the shaft of the disk 11 and by gear mechanism to the shaft of disk 4 as fully shown in said figure. The driving shaft is supported by a bracket extending from the bed 7 and the shafts for the disks 4 and 11 are likewise supported in bearings directly below the bed of the machine. The bevel pinion 13 drives the shaft of disk 11 and the gears 14 connect that shaft with the companion shaft of the other disk 4. The belt 29 is likewise driven through the driving shaft 12 and this belt extends around a pulley 16 at the opposite end of the machine. The pulley 16 is secured to the shaft 17, which shaft has journaled on the opposite end thereof the roller 28, which is the lower roller for the feeding of the metal member 1. The upper roller 27 is mounted in a bearing block 19 which is slidingly mounted in the cradle 15 being spring pressed into normal position and in this way the two feed rollers 27 and 28 feed continuously the metal member through the machine.

As shown clearly in Figs. 3 and 4, the rotary disks 10 are mounted on axes inclined one to the other, which makes the disks more adapted to their intended work since in that way the two lower edges of the disk are brought close together to act as the upper electrode. While the lower electrode is the stationary disk 10, which is supported in brackets extending from the bed of the machine, the axes of the upper disks being supported in bearings, which are formed in the bars 20 which bars are fulcrumed at 21. These bars are connected by links 22 to arms 23 pivotally mounted at 24. These arms 23 carry at their free ends the contact point 25 which is normally spring pressed away from the lower contact point 25 and one wire $a$ of the electric circuit is shown connected to the stationary contact point 25. It is therefore apparent that the circuit is broken whenever the disk 10 is in its lowermost position and that the circuit will be closed whenever the disk 10 is raised, thereby forcing the contact point 25 downwardly into engagement with the stationary contact. This closing of the circuit is brought about by the head of the nail passing beneath the lower edge of the disk 10 thereby raising the disk and closing the circuit. The other line is connected to the stationary electrode in any usual or ordinary way and the bars 20 are insulated from the bed of the machine so as to cause the current to flow through the disk 10 which constitute the upper electrode as heretofore explained.

The interval of time during which the head of the nail is passing between the stationary and movable electrodes is such as to permit the abutting surfaces of the nail and that of the continuously moving metal member 1 to be welded together sufficiently to cause the nail to become secured to said movable member and to be carried by it while it is being guided somewhat by the endless belts 9. The rotary disks also act to hold and guide the nail during the time the current is flowing and before the circuit is again broken, which breaking of the circuit is caused by the head of the nail passing out of contact with said disk 10, thereby permitting the bars 20 to move to the normal position shown in Fig. 2. It will be seen from Figs. 1 and 3 that there are two bars 20 and two switch members, one associated with each bar.

The feed rollers 27 and 28 are continuously rotated as heretofore explained and the upper feed roller 27 is formed with a groove 30 to enable the shank of the nail to pass through the feed roller when the metal member is being fed thereby.

In this way there is disclosed a method of welding intermittently devices such as nails or other attaching devices to a metal bar or similar member while it is being fed continuously through the machine, the arrangement of parts and the intervals of time during which the electric current flows being such as to weld securely the abutting surfaces of those two members.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention I claim as new and desire to secure the following combinations and elements, or equivalents thereof, by Letters Patent of the United States:—

1. In a machine of the character described a combination of a metal member with means for advancing same continuously; metal attaching devices; means for feeding said attaching devices; means for guiding said devices; a rotary member for making contact with said devices; connections from said rotary member to a source of electricity whereby said attaching devices will be welded to said member while they are in contact with said rotary member.

2. In a machine of the character described a combination of a metal member, means for advancing same continuously; metal attaching devices; a rotary member having guiding surfaces for engaging with said attaching devices; connections from said rotary member to a source of electric current whereby said attaching devices will be welded to said continuously moving member while same are being guided by said rotary member.

3. In a machine of the character described a combination of a metal member with means for advancing same continuously; metal attaching devices; projecting parts formed on said attaching devices; a rotary member capable of being moved by contact with said projecting part of said attaching devices; a source of electric current; means for connecting said current to said rotary member whenever said rotary member is moved by contact with said projecting part whereby the attaching device will be welded to said first mentioned member.

4. A rotary welding device for a continuously moving member, comprising a rotary device, attaching devices, a feeding device for said attaching devices, a supplemental feeding device for guiding said attaching devices away from the rotary device, a source of electric current and means for intermittently connecting said rotary device with said source of current whereby said attaching devices will be welded to said first mentioned member.

5. In a machine of the character described, the combination of twin movable electrodes with a stationary electrode, an electric circuit, means for feeding a metal member and attaching devices to said electrodes and means for automatically opening and closing said circuit, whereby the attaching device will be welded to said metal member by contacting against said electrodes.

6. In a machine of the character described the combination of twin movable electrodes placed at an inclination, one to the other, with a stationary electrode, an electric circuit, means for feeding a metal member and attaching devices to said electrodes, part of the attaching device passing between the twin movable electrodes and part passing between the stationary electrode and the movable electrodes and means for automatically opening and closing the electric circuit by the contact of the attaching device with the movable electrodes.

7. In a machine of the character described the combination of a metal strip, attaching devices loosely supported on said strip, means for feeding said strip, guiding means for maintaining the proper position of said attaching devices on said strip, means for welding said attaching devices to said strip after a predetermined movement thereof, said welding means operating on said attaching devices while in continuous advancing movement.

8. In a machine of the character described a supporting bed having a metal strip and attaching devices entering the machine at one end of the bed, means for placing the attaching devices on said strip, guiding devices for maintaining the proper position of said attaching devices on said strip while advancing toward the opposite end of said machine, welding devices in the path of movement and capable of welding and guiding said attaching devices while moving uninterruptedly past said welding devices.

9. The combination of feeding devices for attaching elements with feeding devices for a metal strip, rotary members inclined to the vertical whereby the edges contacting with said attaching devices will be brought close together and connections from said members to a source of electricity.

10. A machine for welding attaching devices to a metal band comprising means for feeding said band, means for feeding said attaching devices to said band, a pair of contact members arranged to engage a portion of said attaching devices positioned at a predetermined distance from said means for feeding the attaching devices, flexible means bridging the space between said means for feeding the attaching devices and contact members for guiding the attaching devices, a welding circuit, and means controlled by said contact members for opening and closing said circuit.

11. A machine for welding attaching devices to a supporting member comprising means for feeding the supporting member, means spaced therefrom for feeding the attaching devices to the supporting member, a plurality of members, intermediate the two feeding means and spaced from each, contacting said devices, flexible movable means bridging the space between said contacting members and feeding means for assisting in the guiding of said attaching devices, means for mounting some of said contacting members for oscillatory movement upon contact with a portion of said attaching devices, a normally open welding circuit, and means for closing said circuit by said oscillatory movement.

12. A machine for welding attaching devices to a supporting member comprising means for feeding the supporting member, means for feeding the attaching devices to said supporting member, a plurality of contact members intermediate and spaced from said feeding means engaging said devices in the movement of the latter, some of said contact members being mounted for oscillatory movement upon engagement with said devices, endless belts bridging the space between said contact members and said feeding means for the attaching devices and extending between the contact members for assisting in the guiding and holding of said attaching devices, a welding circuit, and means for controlling the flow of current therein by said oscillatory movement of the contact members.

In witness whereof, I have hereunto subscribed my name.

HOWARD D. RANDALL.